United States Patent [19]
Chavez, Jr. et al.

[11] Patent Number: 5,758,284
[45] Date of Patent: May 26, 1998

[54] INCREASING THE CAPACITY OF A PERSONAL COMMUNICATION SERVICE SYSTEM BY UTILIZATION OF THE BRIDGED SHARED LINE APPEARANCE FEATURE

[75] Inventors: David Lee Chavez, Jr., Thornton; Michael Ray Ross, Westminster, both of Colo.

[73] Assignee: Lucent Technologies Inc., Murray Hill, N.J.

[21] Appl. No.: 565,797

[22] Filed: Nov. 30, 1995

[51] Int. Cl.[6] ............................................. N04M 11/00
[52] U.S. Cl. .................................... 455/445; 455/436
[58] Field of Search .................................. 379/58, 59, 60, 379/63, 61; 455/33.1, 435, 436, 437, 466, 463

[56] References Cited

U.S. PATENT DOCUMENTS

| | | | |
|---|---|---|---|
| 4,980,907 | 12/1990 | Raith et al. | 379/63 |
| 5,040,177 | 8/1991 | Martin et al. | 370/110.1 |
| 5,182,751 | 1/1993 | Bales et al. | 370/110.1 |
| 5,202,912 | 4/1993 | Breeden et al. | 379/57 |
| 5,222,123 | 6/1993 | Brown et al. | 379/57 |
| 5,255,308 | 10/1993 | Hashimoto et al. | 455/463 |
| 5,325,419 | 6/1994 | Connolly et al. | 455/435 |
| 5,371,782 | 12/1994 | Casey, III et al. | 379/61 |
| 5,390,241 | 2/1995 | Bales et al. | 379/207 |
| 5,396,541 | 3/1995 | Farwell et al. | 379/60 |
| 5,479,483 | 12/1995 | Furuya et al. | 455/433 |
| 5,521,963 | 5/1996 | Shrader et al. | 455/437 |
| 5,590,172 | 12/1996 | Lodwig et al. | 455/436 |
| 5,598,412 | 1/1997 | Griffith et al. | 455/466 |

FOREIGN PATENT DOCUMENTS 9401976   1/1994   WIPO .................. H04Q 7/04

Primary Examiner—Dwayne Bost
Assistant Examiner—Myron K. Wyche
Attorney, Agent, or Firm—John C. Moran

[57] ABSTRACT

Utilizing a bridged line appearance feature in a switching system to allow additional individual PCS systems to be added as the number of wireless sets increases. For each wireless set, a bridged line appearance is administered in the switching system having a group of shared line appearance telephone links where the number of telephone links in each group is equal to the number of individual PCS systems. When the switching system receives a call for a particular wireless set, the switching system signals the incoming call on each telephone link that is part of the shared line appearance group for that particular wireless set. The PCS system on which the particular wireless set is presently registered responds to the incoming call signal by establishing a call between the particular wireless set and the incoming call. During the call, if the wireless set physically moves and establishes communications with a base station of another PCS system, the other PCS system becomes active on the shared line appearance telephone link assigned to the wireless set on the other PCS system. The original PCS system becomes inactive on the shared line appearance telephone link associated with the wireless set when the wireless set transfers itself to the other PCS system. This allows the wireless set to be "handed off" to the other PCS system without the PCS systems having to directly implement the "handoff" operation.

17 Claims, 5 Drawing Sheets

INCREASING THE CAPACITY OF A PERSONAL COMMUNICATION SERVICE SYSTEM BY UTILIZATION OF THE BRIDGED SHARED LINE APPEARANCE FEATURE

TECHNICAL FIELD

This invention relates to personal communication service systems, and, in particular, to expanding the capacity of a personal communication system that is interfaced to a telecommunication switching system.

BACKGROUND OF THE INVENTION

Within the prior art, it is known to connect a personal communication service (PCS) system to a central office (also referred to as a local exchange) or to a business telecommunication switching system (also referred to as a PBX) using what is referred to as a line appearance connection. In a line appearance connection, each wireless set that can connect to the PCS system has a unique number and telephone link on the switching system. The PCS system terminates each of these telephone links and is responsive to a call being received on a telephone link to connect that call to the wireless set assigned to that telephone link. When a wireless set originates a telephone call, the PCS system originates a call via the switching system on the telephone link assigned to the originating wireless set. The principal advantage of the line appearance connection method is that all telephone features are provided by an existing commercial switching system, and the wireless domain becomes independent of the local switching system. In addition, the switching system provides the necessary billing and recording of telephone charges associated with calls originated by a wireless set. The PCS system requires a smaller program to control its functions since the more complicated telephone features and operations are performed by the switching system. The line appearance connection method is particularly useful for adding PCS service to a PBX since the cost of the control portion of the PCS system is relatively low in comparison to a PCS system that provides all of the telephone features and operations. In addition, administration tasks associated with assigning features and telephone numbers to a wireless set are performed by the administration facilities of the switching system. Also, since standard telephone links are utilized to interconnect the PCS system with the switching system, the line appearance connection method allows the PCS system to be added to a large number of existing PBXs from various manufacturers.

The line appearance connection method does, however, suffer from a number of problems. For a small number of wireless sets, the line appearance connection method works extremely well since the PCS system is small and relatively inexpensive. In addition, the more complex switching operations, e.g., conferencing, are provided by the switching system. However, as the number of wireless sets grows, it is necessary to increase the switching capabilities of the PCS system so that an active wireless set can be connected to its dedicated telephone link via the PCS system. In addition, the PCS system must be able to control a proportional number of base stations to the wireless sets. Within many PCS systems, a base station can handle a maximum of two to four active wireless sets. Consequently, for a large PCS system, there are a large number of base stations. This large number of base stations further complicates the problem of increasing the size of the PCS system as the number of wireless sets increases. Indeed, for a large number of wireless sets, the PCS system approaches the complexity of the connected switching system.

What is needed then is a way of growing a PCS system utilizing the line appearance connection method from a small system to a large system and yet retain the advantages of line appearance connection method.

SUMMARY OF THE INVENTION

The foregoing problems are solved, and a technical advance in the art is achieved by a utilization of a bridged line appearance feature in a switching system to allow additional individual PCS systems to be added as the number of wireless sets increases. For each wireless set, a bridged line appearance is administered in the switching system having a group of shared line appearance telephone links where the number of telephone links in each group is equal to the number of individual PCS systems. When the switching system receives a call for a particular wireless set, the switching system signals the incoming call on each telephone link that is part of the shared line appearance group for that particular wireless set. The PCS system on which the particular wireless set is presently registered responds to the incoming call signal by establishing a call between the particular wireless set and the incoming call. During the call, if the wireless set physically moves and establishes communications with a base station of another PCS system, the other PCS system becomes active on the shared line appearance telephone link assigned to the wireless set on the other PCS system. The original PCS system becomes inactive on the shared line appearance telephone link associated with the wireless set when the wireless set transfers itself to the other PCS system. This allows the wireless set to be "handed off" to the other PCS system without the PCS systems having to directly implement the "handoff" operation. In addition, the switching system does not have to have any additional programming to accomplish the "handoff" other than the bridged line appearance feature that is a common feature on most modern switching systems.

These and other advantages and features of the invention will become apparent from the following descriptions of illustrated embodiments of the invention taken together with the drawing.

DETAILED DESCRIPTION

Figure 1:
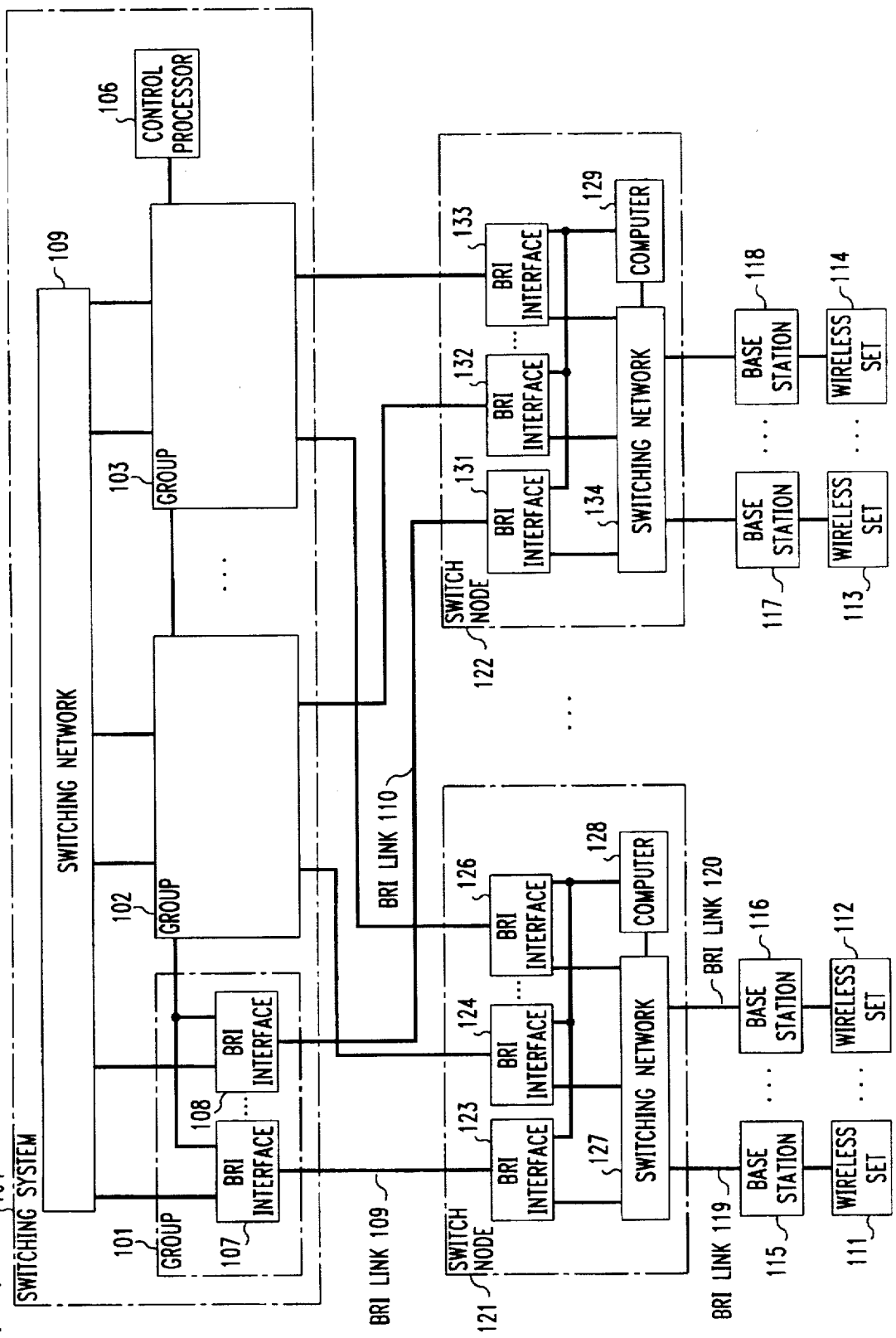
FIG. 1 illustrates, in block diagram form, an embodiment of the invention.

FIG. 1 illustrates an embodiment of the invention. The switch nodes, such as switch node 121, each implements a PCS system. The switch nodes may be advantageously switch nodes as described in U.S. Pat. No. 5,386,466 that is hereby incorporated by reference. Each of the switch nodes illustrated in FIG. 1 can have advantageously a maximum of 256 active telephone calls. Switching system 104 assigns each of the wireless sets a telephone number and a bridged line appearance group. For example, wireless sets 111, 112, and 113 are assigned to to groups 101, 102, and 103, respectively. Each group has one BRI interface for each switch node. For example, BRI interface 107 of group 101 which is assigned to wireless set 111 interconnects to BRI interface 123 in switch node 121 via link 109 and BRI interface 108 is interconnected to BRI interface 131 in switch node 122 via link 110. If a switching system 104 does not support the multipoint/passive bus feature of the ISDN specification, then links 109 through link 110 can only be utilized by wireless set 111. If switching system 104 implements the multipoint/passive bus feature of the ISDN specification, then two wireless sets are assigned to each BRI interface. For example, wireless sets 111 and 114 would each be assigned to BRI interfaces 107 through 108 by switching system 104. In the multipoint configuration, each terminal is assigned one of the B channels of a BRI link and share the D channel. For ease of description, the following description will be based on a BRI interface in switching system 104 being assigned to only one wireless set.

Although not illustrated in FIG. 1, switching system 104 also has primary rate interfaces (PRI) and PRI links to interconnect switching systems 104 to other switching systems or the public telephone network. In addition, switching system 104 has additional BRI interfaces for connecting wired telephone sets to switching system 104. In addition to having PRI and BRI interfaces, switching system 104 uses switching network 109 to switch telephone calls and to provide the necessary tone generation. Control processor 106 controls the operation of switching system 104. Switching system 104 may advantageously be a Definity Business Telecommunication Switching System® manufactured by AT&T. Groups 102 through 103 are similar in construction to group 101. Groups 102 through groups 103 have the identical number of BRI interfaces as group 101.

FIG. 1 illustrates switch node 121 in greater detail. The other switch nodes would be similar in construction. Computer 128 controls the overall operation of switch node 121. Network 127 provides the switching capability and tone generation that is required for the operation of switch node 121. Also for simplicity, the BRI interfaces required for BRI links 119 through BRI link 120 are not shown and are assumed to be part of switching network 127. Only one BRI link is illustrated as interconnecting a base station to a switch node. If a base station can have more than two active calls, then additional BRI links are required or speech compression must be utilized in order to transport more than two voice conversations on the two B channels provided by each BRI link.

The wireless sets can utilize a variety of air protocols such as CT2 or PHS (that is utilized in Japan). In the PHS protocol, the wireless sets automatically register themselves with the base station whose signal is the strongest. Computer 128 maintains a record that defines to which base station a particular wireless set is registered. In the CT2 protocol, the wireless sets do not automatically register; and if an incoming call is received, it may be necessary for computer 128 to have the base stations page for the wireless set. The other switch nodes such as switch node 122 are similar in design to switch node 121.

To better understand the operation of the apparatus illustrated in FIG. 1, consider the following example of an incoming call received by switching system 104 for wireless set 111. This incoming call could be received from another wireless set, a wired telephone to switching system 104, or from the public telephone network. The bridged shared call appearance feature (also referred to as shared call appearance) is described in greater detail in U.S. Pat. No. 5,023,868, that patent is hereby incorporated by reference. In normal implementation of the bridged shared call appearance, one BRI interface of a shared line appearance group is connected to a principal station set while the other BRI interfaces of the group are connected to secretarial station sets. For each of the switch nodes illustrated in FIG. 1, each wireless set has one of the switch nodes designated as the principal switch node corresponding to the principal station set and the other switch nodes are designated as the secretarial station sets. The principal switch node receives the regular ISDN messages whereas the other switch node receive associated ISDN messages. However, the associated ISDN messages have the same content as the regular ISDN messages and throughout this description no distinction is made. Upon receiving an incoming call for wireless set 111, switching network 109 transmits setup messages to switch nodes 121 through 122 via BRI interfaces 107 through 108 of group 101. When the setup messages are received by the computers controlling the switch nodes such as computer 128. They access their internal record to determine if wireless set 111 is registered on a base station connected to the switch node. Assuming that wireless set 111 is registered on base station 115, computer 128 transmits back an alerting message via BRI interface 123, BRI link 109, and BRI interface 107 to control processor 106. Computer 128 then alerts wireless set 111 via BRI link 119 and base station 115 by transmission of a setup message. Once wireless set 111 answers the call, computer 128 establishes a connection via switching network 127, BRI link 119, base station 115 to BRI interface 123. Computer 128 also transmits a connect message to switching system 104. Control processor 106 is responsive to this connect message to interconnect BRI interface 107 to the incoming call via switching network 109. Switch node 122 has received all of the messages transmitted by control processor 106 to computer 128. Computer 129 in switch node 122 maintains a record of the call state of the call on which wireless set 111 is active and associates this record with BRI interface 131 and wireless set 111. Note, after transmission of the connect message to control processor 106 by computer 128, control processor 106 transmits the connect acknowledge message back which confirms the B channel being utilized.

After the call has been set up, assume that wireless set 111 physically moves and establishes communication with base station 117. Once wireless set 111 has established communication with base station 117, wireless set 111 transmits a setup message to computer 129. The setup message defines that a handover is taking place. Computer 129 responds with a request that wireless set 111 authenticate itself. After authentication, computer 129 transmits a setup message to control processor 106. This setup message signals that a set is becoming active on shared line appearance BRI link 110. Control processor 106 interprets this setup message to mean that two station sets are active on the shared line appearance group 101 and responds with a connect message to computer 129. Control processor 106 establishes a three-way conference call between the calling party and the two active BRI links on shared line appearance group 101. Upon receiving a connect message from computer 106 via BRI link 110, computer 129 sends a connect message to wireless set 111. Also in response to the connect message from control processor 106, computer 129 responds with a connect acknowledge message. In response to the connect message, computer 129 establishes an audio path from wireless set 111 to the calling party via base station 117, switching network 134, BRI interface 131, BRI link 110, BRI interface 108, and switching network 109. Computer 128 is responsive to the connect message from control processor 106 to commence the removal of the audio path from base station 115 to network 109 and to update its internal table to indicate that wireless set 111 is active on another switch node. During the authentication process, wireless set 111 identifies itself to computer 129, and computer 129 uses this identification to determine that wireless set 111 is assigned to BRI interface 131.

In response to the connect message from control processor 106, computer 128 removes the connection from base station 115 via BRI link 119, switching network 127, BRI interface 123, and BRI link 109 to BRI interface 107. Computer 128 also transmits a disconnect message to control processor 106. In response to the disconnect message, control processor 106 deactivates BRI interface 107 and BRI link 109. In addition, control processor 106 rearranges switching network 109 so that a three-way call is no longer taking place but rather a two-way call between the calling party and wireless set 111 that is now communicating through base station 117. In connecting the call to BRI interface 108, control processor 106 transmits all messages transmitted to computer 129 also to computer 128. Hence, while still active on the call, if wireless set 111 was to reestablish communication with base station 115, computer 128 and control processor 106 would exchange the necessary messages to transfer the call to BRI interface 107. Assuming that wireless set 111 is still active on base station 117, when wireless set 111 goes on hook, computer 129 transmits a disconnect message to control processor 106. Control processor 106 responds with a release message to which computer 129 replies with a release complete message. Computer 128 is monitoring the messages being transmitted by control processor 106 to computer 129 and is responsive to the transmission of the release message to record in its internal table that there is no active call associated with wireless set 111.

Consider when wireless set 111 originates a telephone call. When wireless set 111 indicates the origination of a telephone call, computer 128 obtains the called telephone number from wireless set 111. Computer 128 then transmits a set up message via BRI interface 123, BRI link 109, and BRI interface 107 to control processor 106. Control processor 106 then transmits a set up message to the called telephone and transmits an alerting message back to computer 128. Computer 128 then sends an alerting message to wireless set 111 using the air protocol. When the called telephone set answers, control processor 106 transmits a connect message to computer 128 which responds with the connect acknowledge message. Computer 128 then controls switching network 127 to establish a call path between BRI link 119 and BRI interface 123. Control processor 106 also transmitted the alerting and connect messages to computer 129 via BRI link 110. Computer 129 records the called state in a record identified with wireless set 111 and BRI interface 131. Should wireless set 111 physically move and register on base station 117, computer 129 will use the previously described messages to have control processor 106 route the call to BRI link 110.

Although FIG. 1 has been described utilizing BRI interfaces and BRI links, other digital protocols could be utilized such as the AT&T DCP protocol (digital call protocol).

Figure 2:
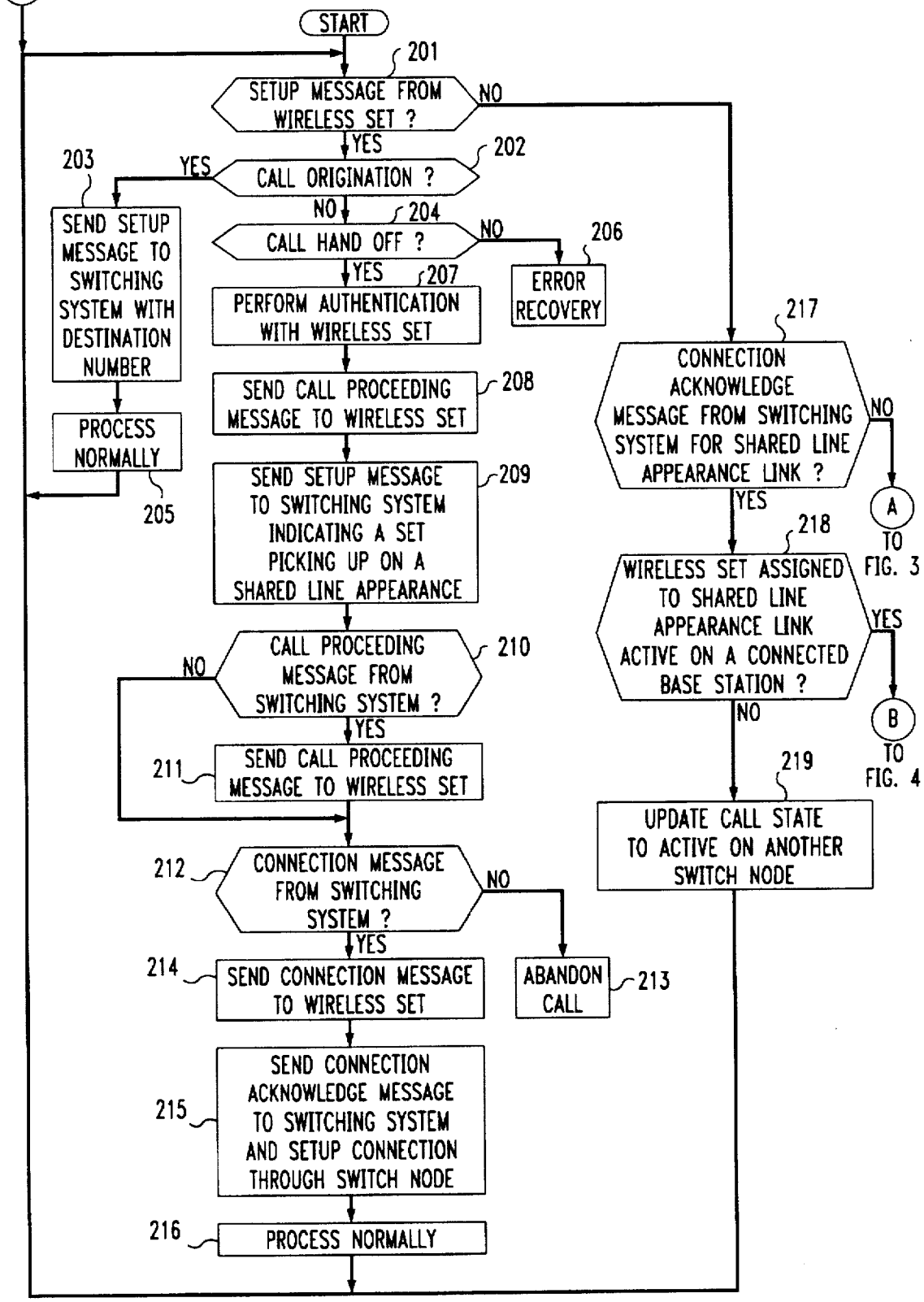
FIGS. 2 through 5 illustrate the operations performed by the switch nodes.
Figure 3:
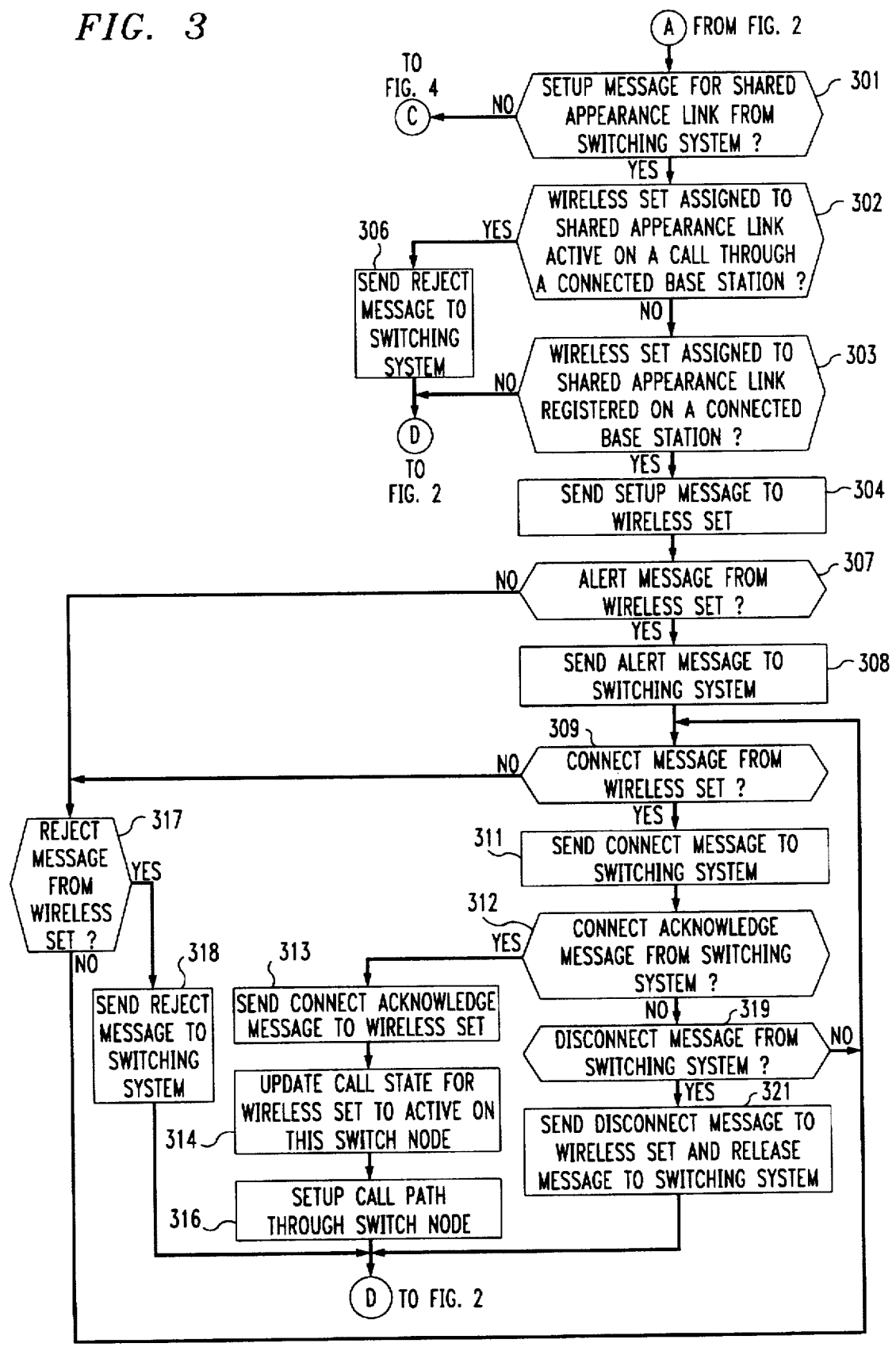
Figure 4:
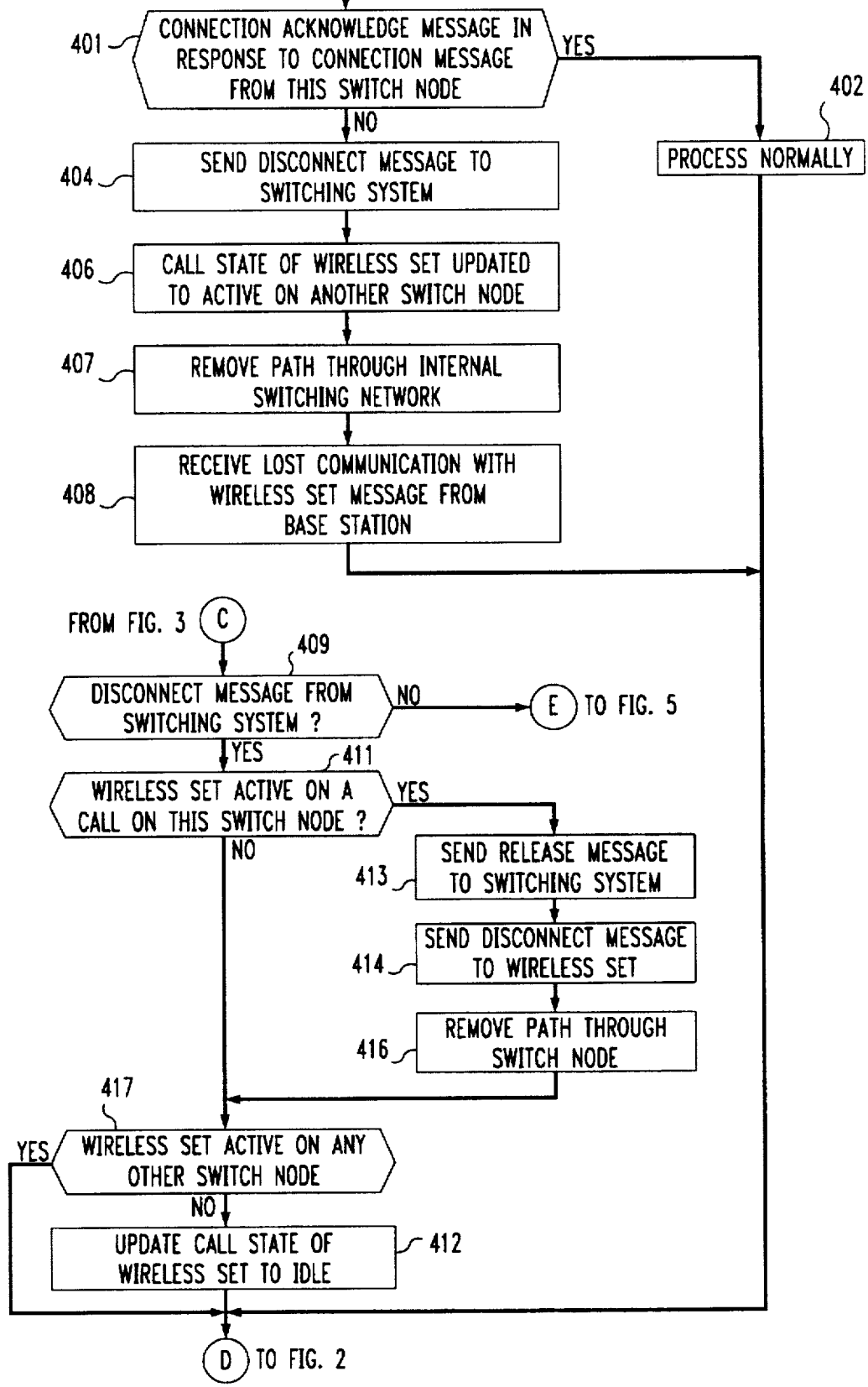

FIGS. 2, 3, and 4 illustrate the operations performed by a computer in a switch node, such as computer 128 of switch node 121, in implementing the invention. In FIG. 2, decision block 201 determines if a setup message has been received from a wireless set. A setup message indicates that the wireless set is either doing a call origination or in the process of doing a call handoff operation. If the answer in decision block 201 is yes, control is transferred to decision block 202. The latter decision block determines if the setup message indicates that the wireless set is doing a call origination. If the answer is yes, control is transferred to block 203 which sends a setup message to the switching system using the destination number that was in the setup message from the wireless set. The call is then processed in a normal manner by block 205 before control is once again returned to decision block 201.

Returning to decision block 202, if the answer is no, control is transferred to decision block 204. The latter decision block determines if the wireless set is performing a handoff operation. If the answer is no, control is transferred to block 206 for error recovery. If the answer in decision block 204 is yes, control is transferred to block 207 which performs the authentication operations with the wireless set. Control is then transferred to block 208. Block 208 sends a call proceeding message back to the wireless set and block 209 sends a setup message to the switching system indicating that a set is picking up on a shared line appearance group. Decision block 210 then determines if a call proceeding message has been received from the switching system. If the answer is no, control is passed to block 212. If the answer is yes in decision block 210, block 211 sends a call proceeding message to the wireless set. Decision block 212 then determines if a connection message has been received from the switching system. If the answer is no, block 213 abandons the call. If the answer in decision block 212 is yes, block 214 sends a connection message to the wireless set. Next, block 215 sends a connect acknowledge message to the switching system and sets up a connection through the switch node to establish communication from the wireless set to the switching system. After this, the call is handled in a normal manner by block 216 which will return control for operations with other wireless sets to decision block 201.

Returning to decision block 201, if the answer is no, control is transferred to decision block 217. The latter decision block determines if a connect acknowledge message was received from the switching system for a shared line appearance link. Such a connect acknowledge message could result from the switch node having transmitted a connection message to the switching system or another switching system having sent the connection message. Decision block 218 determines if the wireless set is active on a base station connected to the switch node. If the answer is no, block 219 records that the wireless set is active on a call on another switch node with the other switch node having been specified in the connection acknowledge message. During a handoff operation, a wireless set will be marked as being active on two switch nodes. Control is then transferred back to decision block 201.

Returning to decision block 218, if the answer is yes, control is transferred to decision block 401 of FIG. 4. Decision block 401 determines if the connect acknowledge message was in response to a connection message transmitted from this node. If the answer is yes, block 402 processes the message in a normal manner before returning control to decision block 201 of FIG. 2. If the answer in decision block 401 is no, this means that the wireless set is marked as being active on this node but a handoff has occurred. The connection message was sent to switch node to which the wireless set was being handed off. If the answer is no in decision block 401, control is transferred to block 404 which sends a disconnect message to the switching node, and block 406 updates the call state for the wireless set as being active on another switch node with the other switch having been specified in the connection acknowledge message. Block 407 then removes the path through the internal switching network of the switch node. Block 408 receives and processes the lost communication with the wireless set message from the base station before transferring control back to decision block 201 of FIG. 2.

Returning to decision block 217 of FIG. 2, if a connect acknowledge message was not received from the switching system, control is transferred to decision block 301 of FIG. 3. Decision block 301 determines if a setup message for a shared line appearance link has been received from the switching system. If the answer is yes, control is transferred to decision block 302. The wireless set for which the setup message is being directed to may be registered on another switch node or may be busy. Decision block 302 determines if the called wireless set is busy on a call on a connected base station in this switch node. If the answer is yes, control is transferred to block 306 which sends a reject message to the switching system before returning control back to decision block 201 of FIG. 2. If the answer in decision block 302 is no, decision block 303 determines if the wireless set is presently registered on a connected base station to this switch node. If the answer is no, control is returned to decision block 201 of FIG. 2. If the wireless is not registered on this switch node, the switch node will wait to mark the wireless set as being active on another switch node until the call completion message is received from the switching system. However, if the wireless set is registered on this switch node, control is transferred to block 304 which sends a setup message to the wireless set.

After execution of block 304, decision block 307 waits for an alerting message from the wireless set. If an alerting message is not received, control is transferred to decision block 317 which determines if a reject message was received from the wireless set. If the answer is yes, a reject message is sent to the switching system by block 318 before control is returned back to decision block 201 of FIG. 2. Returning to decision block 307, if an alert message was received from the wireless set, control is transferred to block 308 which sends an alert message to the switching system and then transfers control to decision block 309. After reception of the alert message from the wireless set, decision block 309 determines if a connect message has been received from the wireless set. When the user of the wireless set answers the telephone call, the wireless set transmits a connection message. If decision block 309 determines that a connection message was not received from the wireless set, decision block 317 determines if a reject message was received from the wireless set. If the answer is no, control is transferred back to decision block 309. If the answer in decision block 309 is yes, block 311 sends a connect message to the switching system, and decision block 312 determines if a connect acknowledge message has been received from this switching system. If the answer in decision block 312 is no, decision block 319 determines if a disconnect message was received from the switching system. The reception of the disconnect message from the switching system indicates that the calling party had abandoned the call. If the answer in decision block 319 is yes, control is transferred to block 321 which sends a disconnect message to the wireless set and a release message to the switching system before transferring control back to decision block 201 of FIG. 2.

Returning to decision block 319, if the answer is no, control is transferred back to decision block 309. Returning to decision block 312, if the answer is yes, block 313 transmits a connect acknowledge message to the wireless set, and block 314 updates the call state for the wireless set to active on this switch node. Finally, block 316 sets up a call path through the switch node between the wireless set and the switching system before transferring control back to decision block 201 of FIG. 2.

Returning to decision block 301 of FIG. 3. If a setup message was not received from the switching system, control is transferred to decision block 409 of FIG. 4. Decision block 409 determines if a disconnect message was received from the switching system. If the answer is no, control is transferred to block 501 of FIG. 5. If the answer in decision block 409 is yes, decision block 411 determines if the wireless set is active on this switch node. If the answer is no, control is transferred to block 417. If the answer in decision block 411 is yes, block 413 sends a release message to the switching system, and block 414 sends a disconnect message to the wireless set. Block 416 removes the path through the switch node before transferring control to block 417. Block 417 determines if the wireless set is active on any switch node. If the answer is no, control is transferred to block 412, otherwise control is passed to decision block 201 of FIG. 2. Block 412 updates the call state of the wireless set to idle and transfers control to block 201 of FIG. 2. If the answer in decision block 417 is yes, control is transferred directly to block 201 of FIG. 2.

Figure 5:
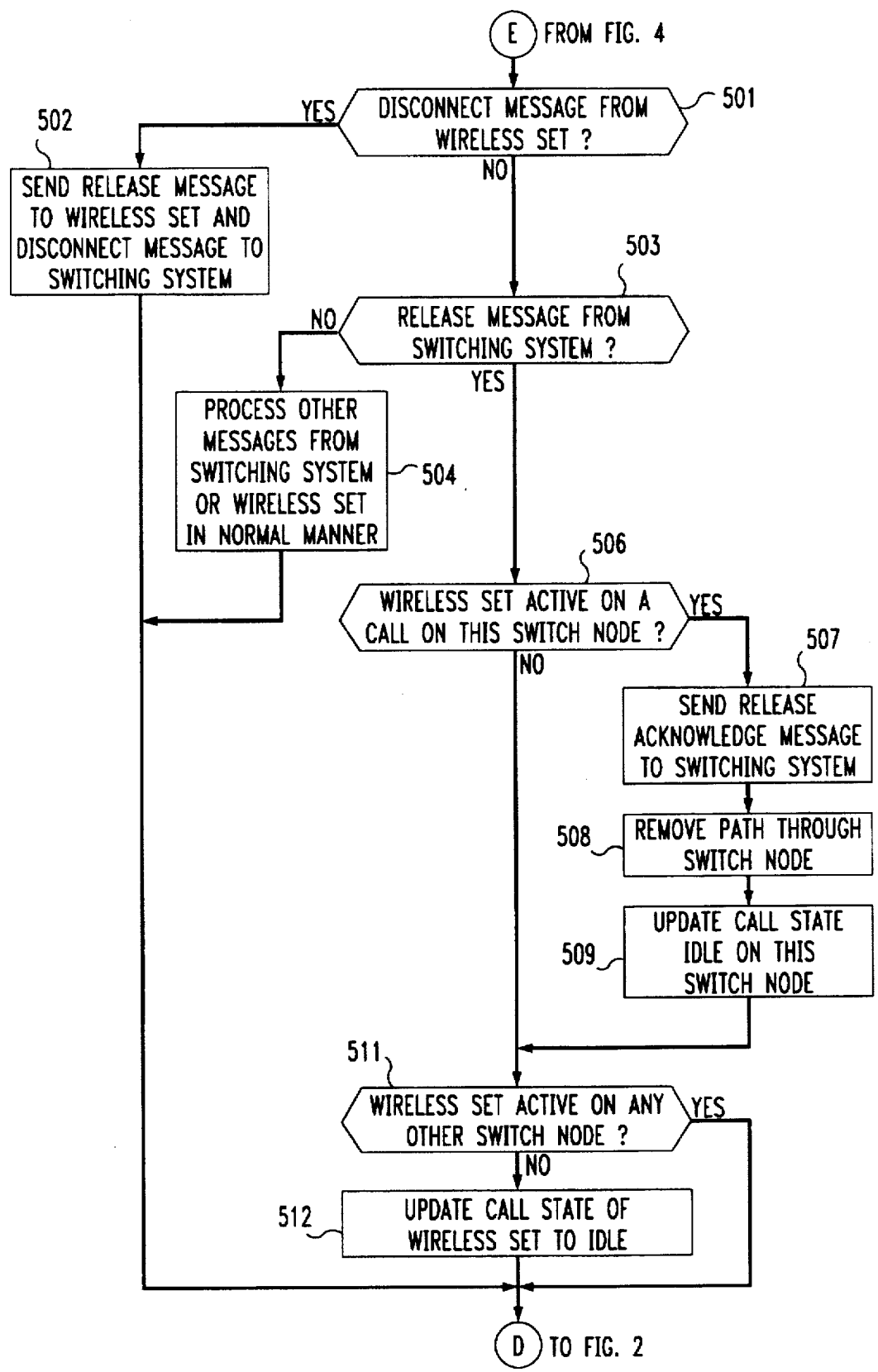

Returning to decision block 409 of FIG. 4, if the answer is no, control is transferred to decision block 501 of FIG. 5. Decision block 501 determines if a disconnect message was received from a connected wireless set. If the answer is yes, block 502 transmits a release message to the wireless set and a disconnect message to the switching system and control is passed to decision block 201 of FIG. 2.

If the answer in decision block 501 is no, decision block 503 determines if a release message has been received from the switching system. If the answer is no, block 504 processes all other messages from the switching system or wireless sets in a normal manner and control is passed to decision block 201 of FIG. 2. If the answer in decision block 503 is yes, decision block 506 determines if the wireless set for which the release message was intended is active on this node. If the answer is yes, block 507 sends a release acknowledge message to the switching system. Block 508 removes the path through the switch node, and block 509 updates the call state of the wireless set to idle on this switch node before transferring control to decision block 511. Decision block 511 determines if the wireless set is active on any switch node. If the answer is yes, control is transferred to decision block 201 of FIG. 2. If the answer in decision block 511 is no, block 512 updates the call state of the wireless set to idle and then control is given to decision block 201 of FIG. 2.

Another embodiment is possible when utilizing BRI links to interconnect switching system 104 to switch nodes 121 through 122. Rather than having each BRI link between switching 104 and switch nodes 121 through 122 assigned to only one or two wireless sets, a greater number of wireless sets are assigned to each BRI link. For example, eight wireless are assign sets to one BRI link. Since there are only two B channels in a BRI link, only two of the wireless sets can be active on the assigned BRI link. This is compensated for by assigning an individual wireless set to a plurality of BRI links. A call directed to a wireless set or originated from wireless set has a high probability of finding a spare B channel. The multipoint/passive bus protocol allows the identification of more than two wireless sets on each BRI link. This embodiment reduces the number of BRI links between switch system 104 and switch nodes 121 through 122.

It is to be understood that the above-described embodiments are merely illustrative of the principles of the invention and that other arrangements may be devised by those skilled in the art without departing from the spirit or scope of the invention.

The invention claimed is:

1. An apparatus for interconnecting a plurality of wireless telephones to a telecommunication switching system, comprising:

a plurality of telephone links arranged in a plurality of subsets with each subset assigned to an individual one of the plurality of wireless telephones and for each one of the plurality of subsets the telecommunication switching system transmitting similar control messages on each one of the telephone links of each one of the plurality of subsets a first wireless system connected to a first plurality of base stations;

the first wireless system and a second wireless system each terminating an individual one of the telephone links of each of the plurality of subsets;

the first wireless system that has a first wireless telephone registered on one of the first plurality of base stations responsive to a call set up message for a call received via a first telephone link of the subset assigned to the first wireless telephone for transmitting an alerting message to the telecommunication switching system on the first telephone link;

the first wireless system responsive to the first wireless telephone answering the call for transmitting a first control message to the telecommunication switching system on the first telephone link;

the first wireless system responsive to a second control message from the telecommunication switching system received on the first telephone link for establishing a first path from the first wireless telephone to the first telephone link; and the second wireless system responsive to the messages transmitted by the telecommunication switching system on a second telephone link of the subset assigned to the first wireless telephone for recording an active call on another wireless system call state for the first wireless telephone.

2. The apparatus of claim 1 wherein the second wireless system responsive to the first wireless telephone registering on one of a second plurality of base stations connected to the second wireless system and the call state for the first wireless telephone indicating an active call on another wireless system for transmitting a third control message to the telecommunication switching system on the second telephone link;

the second wireless system responsive to a fourth control message from the telecommunication switching system received on the second telephone link for establishing a second path from the first wireless telephone to the second telephone link; and the first wireless system responsive to the fourth control message for removing the first path.

3. The apparatus of claim 2 wherein the first wireless system further responsive to the fourth control message for recording an active call on another wireless system call state for the first wireless telephone.

4. The apparatus of claim 3 wherein the plurality of telephone links are ISDN BRI links.

5. An apparatus for interconnecting a plurality of wireless telephones to a telecommunication switching system, comprising a plurality of telephone links arranged in a plurality of subsets with each subset assigned to an individual one of the plurality of wireless telephones and for a each one of the plurality of subsets the telecommunication switching system transmitting similar control messages on each one of the telephone links of the each one of the plurality of subsets a plurality of wireless systems each having a plurality of base stations;

each of the plurality of wireless systems terminating an individual one of the telephone links of each of the plurality of subsets;

a first one of the plurality of wireless systems that has one of the plurality of wireless telephones registered on one of the plurality of base stations of the one of the plurality of wireless systems responsive to a call set up message for a call received via one of the telephone links of the subset assigned to the one of the plurality of wireless telephones for transmitting an alerting message to the telecommunication switching system on the one of the telephone links of the subset assigned to the one of the plurality of wireless telephones;

the first one of the plurality of wireless systems responsive to the one of the plurality of wireless telephones answering the call for transmitting a first control message to the telecommunication switching system on the one of the telephone links of the subset assigned to the one of the plurality of wireless telephones;

the first one of the plurality of wireless systems responsive to a second control message from the telecommunication switching system received on the one of the telephone links of the subset assigned to the one of the plurality of wireless telephones for establishing a first path from the one of the plurality of wireless telephones to the one of the telephone links of the subset assigned to the one of the plurality of wireless telephones; and other ones of the plurality of wireless systems responsive to the messages transmitted by the telecommunication switching system on other ones of telephone links of the subset assigned to the one of the plurality of wireless telephones for recording an active call on another wireless system call state for the one of the plurality of wireless telephones.

6. The apparatus of claim 5 wherein a second one of the plurality of wireless systems responsive to the one of the plurality of wireless telephones registering on one of the plurality of base stations of the second one of the plurality of wireless systems and the call state for the one of the plurality of wireless telephones indicating an active call for transmitting a third control message to the telecommunication switching system on a second one of the telephone links of the subset assigned to the one of the plurality of wireless telephones;

the second one of the plurality of wireless systems responsive to a fourth control message from the telecommunication switching system received on the second one of the telephone links of the subset assigned to the one of the plurality of wireless telephones for establishing a second path from the one of the plurality of wireless telephones to the second one of the telephone links of the subset assigned to the one of the plurality of wireless telephones; and the first one of the plurality of wireless systems responsive to the fourth control message for removing the first path.

7. The apparatus of claim 6 wherein the first one of the plurality of switch nodes further responsive to the fourth control message for recording an active call on another wireless system call state for the one of the plurality of telephone links.

8. The apparatus of claim 7 wherein the plurality of telephone links are ISDN links.

9. An apparatus for interconnecting a plurality of wireless telephones to a telecommunication switching system, comprising:

a plurality of telephone links arranged in a plurality of telephone link subsets with each telephone link subset assigned to each wireless telephone of a wireless telephone subset of the plurality of wireless telephones and for a each one of the plurality of telephone link subsets the telecommunication switching system transmitting similar control messages on each one of the telephone links of the each one of the plurality of telephone link subsets a plurality of wireless systems each having a plurality of base stations;

each of the plurality of wireless systems terminating an individual one of the telephone links of each of the plurality of telephone link subsets;

a first one of the plurality of wireless systems that has one of the plurality of wireless telephones registered on one of the plurality of base stations of the one of the plurality of wireless systems responsive to a call set up message for a call received via one of the telephone links of the telephone link subset assigned to the one of the plurality of wireless telephones for transmitting an alerting message to the telecommunication switching system on the one of the telephone links of the telephone link subset assigned to the one of the plurality of wireless telephones;

the first one of the plurality of wireless systems responsive to the one of the plurality of wireless telephones answering the call for transmitting a first control message to the telecommunication switching system on the one of the telephone links of the telephone link subset assigned to the one of the plurality of wireless telephones;

the first one of the plurality of wireless systems responsive to a second control message from the telecommunication switching system received on the one of the telephone links of the telephone link subset assigned to the one of the plurality of wireless telephones for establishing a first path from the one of the plurality of wireless telephones to the one of the telephone links of the telephone link subset assigned to the one of the plurality of wireless telephones; and other ones of the plurality of wireless systems responsive to the messages transmitted by the telecommunication switching system on other ones of telephone links of the telephone link subset assigned to the one of the plurality of wireless telephones for recording an active call on another wireless system call state for the one of the plurality of wireless telephones.

10. The apparatus of claim 9 wherein a second one of the plurality of wireless systems responsive to the one of the plurality of wireless telephones registering on one of the plurality of base stations of the second one of the plurality of wireless systems and the call state for the one of the plurality of wireless telephones indicating an active call for transmitting a third control message to the telecommunication switching system on a second one of the telephone links of the telephone link subset assigned to the one of the plurality of wireless telephones;

the second one of the plurality of wireless systems responsive to a fourth control message from the telecommunication switching system received on the second one of the telephone links of the telephone link subset assigned to the one of the plurality of wireless telephones for establishing a second path from the one of the plurality of wireless telephones to the second one of the telephone links of the telephone link subset assigned to the one of the plurality of wireless telephones; and the first one of the plurality of wireless systems responsive to the fourth control message for removing the first path.

11. The apparatus of claim 10 wherein the first one of the plurality of switch nodes further responsive to the fourth control message for recording an active call on another wireless system call state for the one of the plurality of telephone links.

12. The apparatus of claim 11 wherein there are two wireless telephones in a wireless telephone subset.

13. The apparatus of claim 12 wherein the plurality of telephone links are ISDN BRI links.

14. A method for interconnecting a plurality of wireless telephones to a telecommunication switching system and the telecommunication switching system having a plurality of telephone links arranged in a plurality of subsets with each subset assigned to an individual one of the plurality of wireless telephones and for each one of the plurality of subsets the telecommunication switching system transmitting similar control messages on each one of the telephone links of the each one of the plurality of subsets and a first wireless system connected to a first plurality of base stations and the first wireless system terminating an individual one of the telephone links of each of the plurality of subsets and a second wireless system connected to a second plurality of base stations and the second wireless system terminating an individual one of the telephone links of each of the plurality of subsets, the method comprising the steps of:

transmitting an alerting message to the telecommunication switching system on the first telephone link by the first wireless system that has a first wireless telephone registered on one of the first plurality of base stations in response to a call set up message for a call received via a first telephone link of the subset assigned to the first wireless telephone;

transmitting a first control message to the telecommunication switching system on the first telephone link by the first wireless system in response to the first wireless telephone answering the call;

establishing a first path from the first wireless telephone to the first telephone link by the first wireless system in response to a second control message from the telecommunication switching system received on the first telephone link; and recording an active call on another wireless system call state for the first wireless telephone by the second wireless system in response to the messages transmitted by the telecommunication switching system on a second telephone link of the subset assigned to the first wireless telephone.

15. The method of claim 14 further comprises the steps of transmitting a third control message to the telecommunication switching system on the second telephone link by the second wireless system in response to the first wireless telephone registering on one of a second plurality of base stations connected to the second wireless system and the call state for the first wireless telephone indicating an active call on another wireless system;

establishing a second path from the first wireless telephone to the second telephone link by the second wireless system in response to a fourth control message from the telecommunication switching system received on the second telephone link; and removing the first path by the first wireless system in response to the fourth control message.

16. The method of claim 15 further comprises the step of recording an active call on another wireless system call state for the first wireless telephone by the first wireless system in response to the fourth control message.

17. The method of claim 16 wherein the plurality of telephone links are ISDN BRI links.

* * * * *